UNITED STATES PATENT OFFICE.

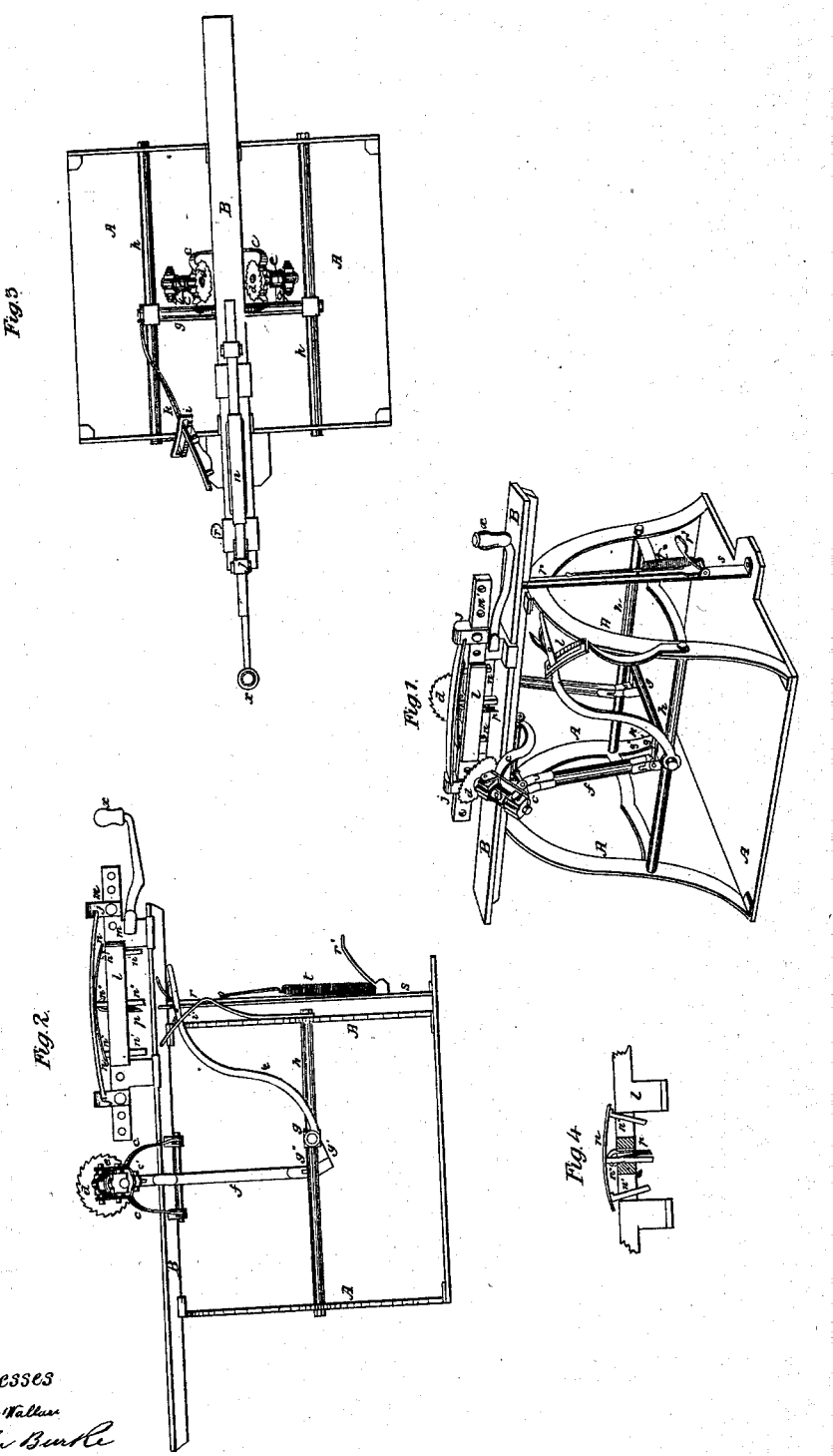

JAMES LITTLE, OF EVANSVILLE, INDIANA.

STAVE-MACHINE.

Specification of Letters Patent No. 26,505, dated December 20, 1859.

*To all whom it may concern:*

Be it known that I, JAMES LITTLE, of Evansville, in the county of Vanderburg and State of Indiana, have invented a new and useful Improvement in Machines for Pointing Staves; and I do hereby declare that the following is a full and clear description thereof, reference being had to the accompanying drawings and to the letters of reference marked thereon and made to form a part of this specification.

The nature of my invention relates to certain improvements in stave jointing machine, by means of which, with the use of saws, I am enabled to joint staves of any length or curve, required upon both sides at the same time, as hereinafter set forth and represented.

In reference to the accompanying drawings Figure 1 is a perspective view, Fig. 2, a vertical sectional view, and Fig. 3, a plan or top view of the machine with all its parts arranged for operation. Fig. 4, is a sectional view showing the device for giving the proper curve or bulge to the stave.

(A) represents the frame of the machine.

(B) is a carriage way, mounted on the top of, and securely attached to said frame (A). Hinged to the under side of said carriage way (B), are two saw frames (c, c) constructed and arranged in such manner, that the saws (d) may be adjusted with the proper inclination to give the necessary bevel to the sides of the staves. The said saws (d) are arranged upon arbors which have bearings in or upon the saw frames (c c) and are provided with pulleys (e) by means of which the saws may be driven.

(f, f) are jointed rods, hinged to the saw frames (c, c) at (c'), and to the arms (g') of shaft (g) at (g''). The shaft (g) has bearings in rods (h) of frame (A).

(k) is a lever attached to the shaft (g) and provided with a spring dog (i). Said lever (k) extends upwardly through a rack (i') in such manner as to be convenient for the operator, and by means of said lever, through the medium of shaft (g) rods (f) and hinged frames (c) the saws (d) may be adjusted to the width of the stave to be jointed.

(l) is a carriage constructed in such manner that it may slide upon the carriage way (B) and provided with head blocks (j) which are adjustable to the length of the stave by means of pins (m) and perforations (m'). The said blocks (j) have in them grooves for holding the stave, as is clearly shown in Fig. 1.

(n) is an adjustable bed for the stave, provided with bars (n', n'') which pass through slots in the carriage (l). The center bar (n'') is provided with a spring catch (p) by means of which the bed (n) may be secured in the position to give the proper curve or bulge to the stave to be jointed. The said bed (n) is operated by means of the rod (r) and foot lever (r') which is pivoted to the post (s). The rod (r) passes through the carriage way (B), so that when the carrriage (l) is drawn back to the proper position to receive a stave the upper end of rod (r) is opposite the lower end of bar (n'') so that by depressing the lever (r') the rod (r) is forced up against the bar (n''), by means of which the bed (n) will be elevated, so as to give the desired curve to the stave. (t) is a spring, arranged with reference to the rod (r), so, that the upper end of said rod may be kept below the surface of the carriage way, when not required to operate the bed (n).

Having described the construction of my invention its operation may be set forth as follows. Proper power being used to drive the saws, and the carriage (l) being in the position shown in Fig. (2): the stave will be adjusted in the heads (j) as before described, and the lever (k) will be depressed, so as to elevate the center of the stave in such manner as to secure the desired bulge. The lever (r') will then be operated so as to adjust the saws (d) to the width of the staves. The operator will then move the carriage (l) (by means of the handle (x)) so as to carry the stave between the saws. Said saws being in operation, both sides of said stave will be jointed, at the proper angle or bevel for use, and the proper bulge will at the same time be secured, so that the stave is completely and perfectly jointed, in one operation.

I do not claim jointing staves by means of two inclined circular saws, neither do I claim bending the stave so as to give it the proper bulge or curve preparatory to jointing the same; for I am aware inclined saws have been used and that staves have been bent for like purposes. But Having described the construction and operation of my invention, what I do claim as new, and desire to secure by Letters Patent is—

The adjustable bed (n) in combination with the rod (r) and lever (r') all being constructed and arranged to operate substantially as and for the purposes set forth.

In testimony of which invention I have hereunto set my hand.

JAMES LITTLE.

Witnesses:
W. L. WALLACE,
JOHN BURKE.